(12) United States Patent
Cook et al.

(10) Patent No.: US 9,491,930 B2
(45) Date of Patent: Nov. 15, 2016

(54) LIGHT PROJECTING PET TOY

(75) Inventors: Alan J. Cook, Chicago, IL (US); Kevin John Augustyniak, Elma, NY (US)

(73) Assignee: Radio Systems Corporation, Knoxville, TN (US)

( * ) Notice: Subject to any disclaimer, the term of this patent is extended or adjusted under 35 U.S.C. 154(b) by 1612 days.

(21) Appl. No.: 13/395,854

(22) PCT Filed: Oct. 16, 2009

(86) PCT No.: PCT/US2009/061087
§ 371 (c)(1),
(2), (4) Date: Aug. 9, 2012

(87) PCT Pub. No.: WO2010/045612
PCT Pub. Date: Apr. 22, 2010

(65) Prior Publication Data
US 2012/0298049 A1    Nov. 29, 2012

Related U.S. Application Data

(60) Provisional application No. 61/106,044, filed on Oct. 16, 2008.

(51) Int. Cl.
*A01K 29/00* (2006.01)
*A01K 15/02* (2006.01)

(52) U.S. Cl.
CPC .................................. *A01K 15/025* (2013.01)

(58) Field of Classification Search
CPC .................................................. A01K 15/025
USPC ....... 119/707, 702; 362/296.01, 296.09, 202, 362/157
See application file for complete search history.

(56) References Cited

U.S. PATENT DOCUMENTS

| | | | |
|---|---|---|---|
| 5,111,771 A | 5/1992 | Mathews | |
| 5,443,036 A | 8/1995 | Amiss et al. | |
| 5,934,223 A * | 8/1999 | Ellery-Guy | A01K 15/025 119/702 |
| 6,505,576 B2 * | 1/2003 | Nathanson | A01K 15/025 119/702 |
| 6,550,426 B2 | 4/2003 | Tsengas | |
| 6,557,495 B2 * | 5/2003 | Lorenz | A01K 15/025 119/707 |
| 6,591,785 B1 | 7/2003 | Boshears | |
| 6,640,750 B2 | 11/2003 | Rowe et al. | |
| 6,651,591 B1 * | 11/2003 | Chelen | A01K 15/027 119/707 |
| 6,701,872 B1 | 3/2004 | Allen | |
| 7,066,780 B2 | 6/2006 | Jamison | |
| 7,712,909 B2 * | 5/2010 | Nobayashi | B60Q 1/2611 362/277 |
| 7,762,213 B2 | 7/2010 | Cook et al. | |
| 7,997,230 B2 | 8/2011 | Cook et al. | |
| D646,443 S | 10/2011 | Cook et al. | |

(Continued)

FOREIGN PATENT DOCUMENTS

JP    2002-176873    6/2002

OTHER PUBLICATIONS

Office Action from IP Australia.

(Continued)

*Primary Examiner* — Kristen C Hayes
(74) *Attorney, Agent, or Firm* — Peter L. Brewer; Baker Donelson IP

(57) ABSTRACT

A laser pet toy including a light source with a focused beam of light of a predetermined shape and programmable random travel across an opaque surface such as a floor or wall to create an engaging image for a pet to play with the image for entertainment or exercise.

15 Claims, 9 Drawing Sheets

(56) References Cited

U.S. PATENT DOCUMENTS

| | | |
|---|---|---|
| 8,028,659 B2 | 10/2011 | Cook et al. |
| 8,161,908 B2 | 4/2012 | Cook et al. |
| D659,305 S | 5/2012 | Song et al. |
| 8,166,918 B2 | 5/2012 | Cook et al. |
| 8,166,919 B2 | 5/2012 | Cook et al. |
| 8,166,920 B2 | 5/2012 | Cook et al. |
| 8,328,368 B2 | 12/2012 | Luciano |
| 8,347,823 B1 | 1/2013 | Thomas et al. |
| 8,789,986 B2* | 7/2014 | Li .......................... F21S 6/001 362/393 |
| 8,926,137 B2* | 1/2015 | Li .......................... F21S 6/001 362/202 |
| 9,371,973 B2* | 6/2016 | Li .......................... F21S 10/046 |
| 2001/0037773 A1 | 11/2001 | Nathanson et al. |
| 2002/0002955 A1* | 1/2002 | Lorenz ................ A01K 15/025 119/707 |
| 2003/0150398 A1* | 8/2003 | Nathanson .......... A01K 15/025 119/707 |
| 2005/0056033 A1 | 3/2005 | Gingras |
| 2008/0011243 A1 | 1/2008 | Moulton |
| 2010/0079999 A1* | 4/2010 | Schnuckle ............ F21S 10/04 362/253 |
| 2011/0265728 A1 | 11/2011 | Cook et al. |
| 2012/0097114 A1* | 4/2012 | Scott ................... A01K 15/025 119/707 |
| 2012/0134157 A1* | 5/2012 | Li .......................... F21S 6/001 362/277 |
| 2012/0234258 A1 | 9/2012 | Cook et al. |
| 2012/0298049 A1 | 11/2012 | Cook et al. |
| 2013/0081577 A1 | 4/2013 | Morris |
| 2015/0036348 A1* | 2/2015 | Dong ................... F21S 10/046 362/293 |

OTHER PUBLICATIONS

JPO Office Action (English Translation).
Web page from www.frolicat.com for "Bolt" toy printed May 13, 2013 (3 pages).
Web page from www.frolicat.com for "Dart" toy printed May 13, 2013 (3 pages).
Web page from www.frolicat.com for "Sway" toy printed May 13, 2013 (3 pages).
Web page from www.frolicat.com for "Twitch" toy printed May 13, 2013 (3 pages).

* cited by examiner

LIGHT PROJECTING PET TOY

BACKGROUND OF THE INVENTION

1. Technical Field

The present invention relates to a light projecting toy for entertaining and exercising a pet. More particularly, the invention relates to a portable laser or LED pet toy projecting a laser or LED light beam of a predetermined object shape onto a floor or wall where the pet can engage the light object that moves randomly about in a generally non-linear pattern.

2. Description of the Prior Art

There are a number of prior art patents that show various laser and light emitting pet toys. For example, U.S. Pat. No. 5,443,036 discloses inducing aerobic exercise in an unrestrained cat by moving a hand-held laser device that projects an invisible light onto a floor, wall or other opaque surface but is a totally manual device requiring the holder to develop irregular patterns of interest to the cat or other pet. The specification describes a laser to project a spot of light on the floor for cats to chase (Element 22 in FIG. 1; Column 2, Lines 45-49 for different shapes; Claims 1-3. Further, U.S. Pat. No. 7,066,780 discloses an entertainment device with the remote control projection and movement of a laser beam by a laser director that manipulates both the horizontal and vertical movement of the laser beam for diversion of a pet (Element 16 in FIGS. 1A, 1B; Claims 1, 2, 4-6, 8, 10-11 and 14-18). The problem with this pet toy is that it is worn around the neck of the cat or dog, which are notorious for pawing and biting off collars and other items attached to their necks. This would require the pet owner to generally be present at all times during the entertaining or exercising effort with the pet toy least it be damaged by the pet during its operation. Next, U.S. Patent Application Publication Number 2008/0011243 discloses an interactive laser toy for exercising, entertaining and stimulating a pet with a dial to select an image to project that will stimulate a pet to exercise (Paragraphs [0002] and [0020]-[0023]; Claims 1-11, Element 4 in FIG. 2). The problem with this pet toy is similar to the one above where the pet owner needs to be present for this toy to be effective. Finally, U.S. Pat. No. 5,823,844 discloses an interactive vibrating toy for play with a pet animal actuated by a sensor activating the toy to move when a pet approaches. The vibrating toy on a flexible wire is an interesting variation but does not constitute a light beam pet toy where random movement is most desired and is more of a mechanical toy from prior years.

Thus, the prior art light and mechanical toys all have various shortcomings that prevent the animal from being entertained and exercised without involvement by the pet owner except for U.S. Pat. No. 5,823,844 that includes a flexible wire, of preferably metal, that could possibly injury a pet that is too aggressive with this toy by the whipping wire coming in contact with certain body areas of the pet.

Therefore, pet owners who would like to exercise and entertain their pet when present or busy doing something else in the house might want to try a light emitting pet toy where the object that is chased by the pet is safe for the pet to play with so that the pet owner can be out of sight or otherwise engaged while their pet is playing. For example, the pet toy might include a light source from a laser or Light Emitting Diode (LED) to project the beam of light onto an opaque surface such as a floor, wall or some other object. The desired pet toy may have a manual mode were the light source is on but a motor in the toy is off so the pet owner creates the motion like shown in the '036 patent.

Next, the pet owners may want to exercise their pet only for a limited time with such a pet toy and so the pet toy may incorporate an automatic shut off whereby the toy automatically turns the unit off after a preset time adjustable by the pet owner. The toy might also have a built-in timer so the pet toy turns on/off automatically according to a timer, whereby the pet owner sets the time or times in preset intervals. Other means for turning on the pet toy, such as motion, light, heat or other type of sensors, are also practical with current known electronics.

The pet owner may also have a wireless connection to the pet toy via infrared or radio signals sent by a remote control, PDA, computer or even a signal from another similar equipped pet toy. A sophisticated sensor could also track and provide interaction with the pet by detecting the pet and then shining the light wherever the pet is not.

Various levels of feedback to the cat or other pet are possible too through various sounds and light adjustments. The pet toy might play a sound or adjust the light in response to the pet "catching" the light object. The toy could make a sound at startup or at play or at the end of the activity. The pet owner may include recordable voices of the pet owner or sounds that imitate the projected light object such as a mouse or bug.

Counters are also available for incorporation into the toy for keeping track of how many times the pet toy was used or turned on by either the pet owner or the pet and then have the tracking fed wirelessly into one's PDA or computer to log such events. The pet toy might even send a signal to the pet owner's cell phone, such as a text message, when their pet is playing with the toy, which can be very helpful if the pet owner is out of view of their pet but still wants feedback as to when their pet is exercising or being entertained.

The pet toy might also have a built-in night-light or other non-laser light such as an LED light within the pet toy. The pet toy that is mounted higher upon a counter might have a power source from an electrical outlet but may also include batteries that are disposable or rechargeable. Certain pet toys used in solariums or places near a window might have solar or other sources of energy that are particularly well suited for a certain pet toy. Moreover, the casing on the toy might be translucent allowing light to pass through the entire casing and not out just through an opening or clear lens. Especially, a solar powered toy may include the translucent case for light to hit solar cells within the pet toy to avoid damage to the solar cell by the pet.

The range of motion of the light for the toy is generally desirable to have the light move randomly in a 360-degree circle, elliptical or other predetermined paths.

SUMMARY OF THE INVENTION

The present invention relates to a light emitting pet toy, which provides various advantages over the prior art light emitting pet toys for entertaining and exercising pets. In particular, there are several embodiments for the housing of the toy, but the internal components for directing a beam of light from a laser or LED remain essentially the same platform throughout the variations in the housing design. In one embodiment, a highlight of the pet toy is that the laser or LED light source is mounted on a spring that is then mounted on a turntable attached to a motor shaft, or the laser is mounted directly on the turntable itself. The spring mount of the laser imitates live motion of a bug, a mouse or other object that a cat might play with in the house. In other embodiments, the laser source or LED is aligned to the product axis. When it is powered, the light beam passes through an aperture that has a desired configuration or opening in a housing of the toy. When the light beam strikes a surface outside of the opening, its shape is formed by whatever aperture shape the laser beam passes through as it travels out of a laser barrel in which the light must pass through to the outside world. The configuration of the light beam that focuses on the floor or wall for the pet to play with takes whatever shape the masking is used over the opening of the laser housing. Prior art patents show cut outs of different figures over the aperture in which the laser light passes through the barrel housing of the laser or LED. A rotating mechanism with multiple apertures can be rotated into different positions to create different shaped light or laser beams upon the floor or wall. In one design multiple lasers or openings for the laser light are attached to the turntable allowing multiple lights to shine on a surface such as a floor or wall. In another embodiment, the light beam is offset from the vertical axis of the motor drive to provide a more random moving object for the pet to engage. Each laser pet toy system includes certain basic elements, which are a source of power, an off/on switch activating the power source, a printed circuit board or application specific integrated chip (ASIC) controlling a motor through predetermined software programming for random movement of the projected light beam in predetermined patterns, a laser or LED connected to motor shaft and a mirror within the housing projecting the beam of light outside of the housing to an opaque surface for attracting a pet.

These and other advantages of the present invention will be readily understood with reference to the following specification and attached drawing wherein.

DETAILED DESCRIPTION

The present invention relates to an automatic or manual operated laser or light emitting pet toy for a pet such as a cat or dog. FIGS. 1-9 are an illustration of two embodiments of a laser pet toy made in accordance with the present invention.

Figure 1:
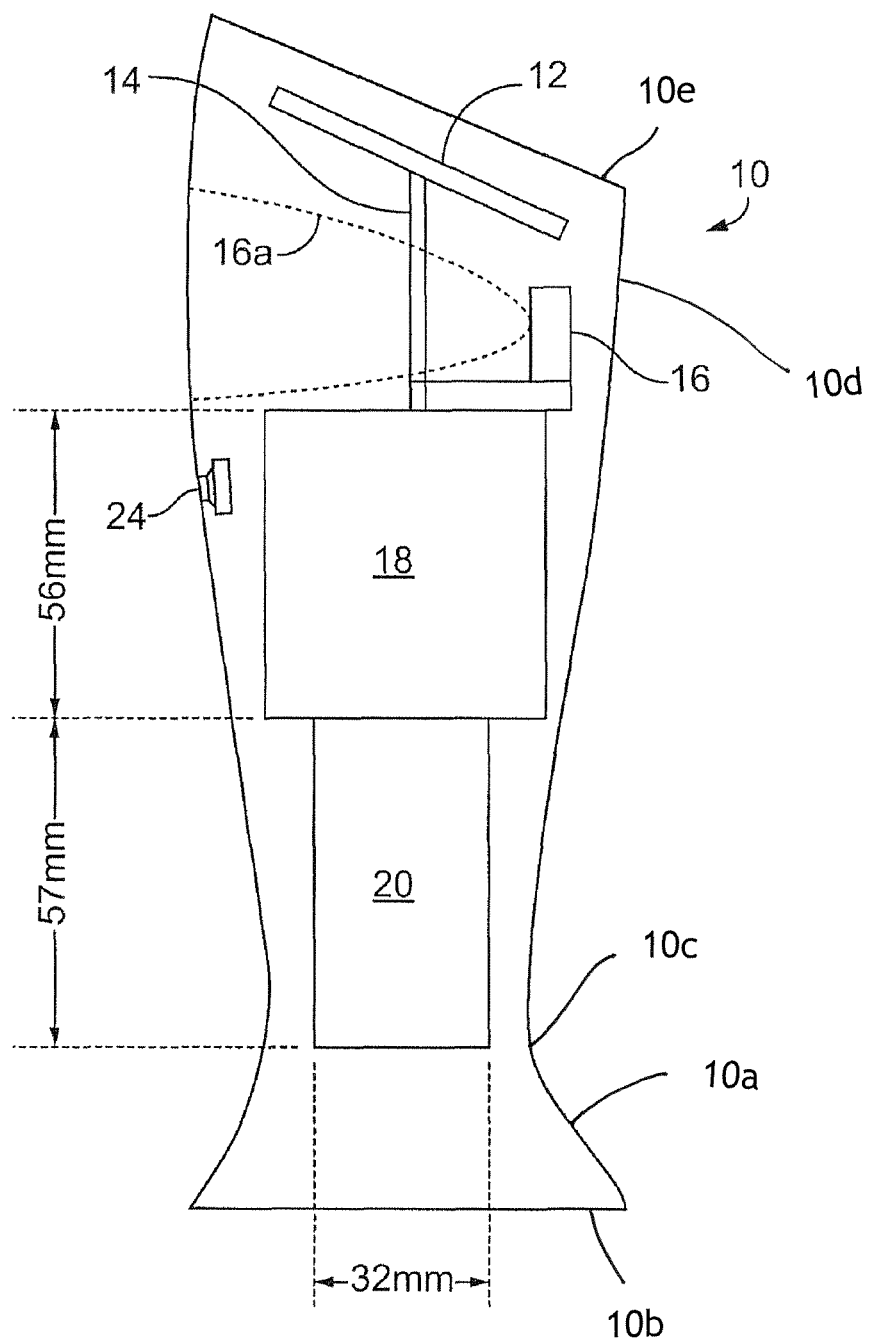
FIG. 1 is a schematic view of the laser pet toy illustrating a housing with various components therein in accordance with one embodiment of the present invention.
Figure 9:
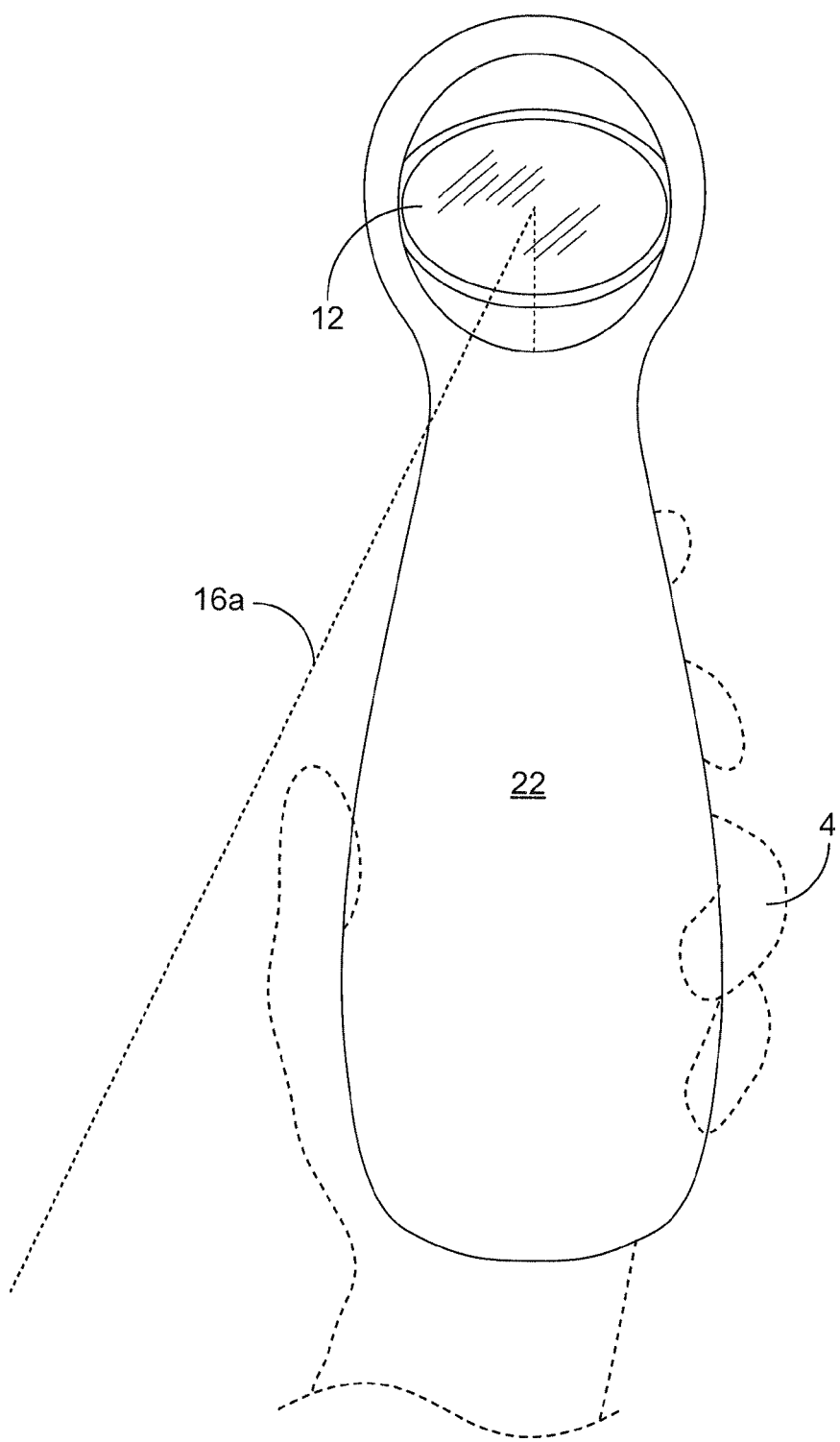
FIG. 9 is a front view of an end user holding the laser pet toy in a manual mode in accordance with the second embodiment of the present invention of FIG. 2.

FIG. 1 shows a diagrammatic illustration of one embodiment of a laser pet toy 10 that includes an outer shell generally in the shape of a vase. The toy 10 includes a hollow core with a foot 10*a* having a flat bottom 10*b* for standing the toy upright on a table or floor for engaging a feline or canine in play with a laser beam 16*a* ending in a red spot of a predetermined shape (not shown). The foot 10*a* of the toy is connect to a short neck 10*c* suitable for being gripped by a hand to operate the toy in a manual mode as shown in FIG. 9. The neck 10*c* is connected to the bulbous body or head 10*d* of the toy 10 extending upwardly to terminate in an angled and generally flat crown 10*e*. When the pet owner places the toy 10 on a flat surface, such as a table or floor, it is then turned on to engage the pet.

The neck 10*c* and head 10*d* of the toy 10 form a housing to mount and arrange mechanical and electrical components, including a laser 16 for projecting the laser beam 16*a* terminating in the generally red spot of the predetermined shape on an opaque surface. The head 10*d* includes an opening therein and a mirror 12, for directing the laser beam 16*a* reflected off its surface onto the opaque surface for pet play, movably affixed within the upper end of the head 10*d* and generally adjacent the crown 10*e*. The mirror is movably affixed within the head 10*d* for adjusting the projection of the red laser beam reflected off the mirror 12 and out of opening in the upper end of the head 10*d* to the opaque surface. A source of power 20 is connected to a motor with an axial shaft and gearing 18 that moves the laser 16 that is connected via an arm attached to the shaft of the motor to generate various predetermined laser patterns. The axial shaft, which is connected to the arm upon which the laser 16 is mounted, extends perpendicular to the axis of the motor shaft where the laser 16 is mounted a distal end of the arm and its laser beam 16*a* is directed upwardly to impinge on the surface of the mirror 12 and reflect out of the head 10*d* onto the flat opaque surface to impart non-linear and random laser light patterns on the opaque surfaces as the arm moves with the motor shaft. The motor is generally controlled by a software program embedded in a control board circuit that may include an application specific integrated chip or similar control circuit to control the laser patterns projected out of the toy head 10*d* onto the opaque surfaces for the cats or dogs to play.

Figure 2:
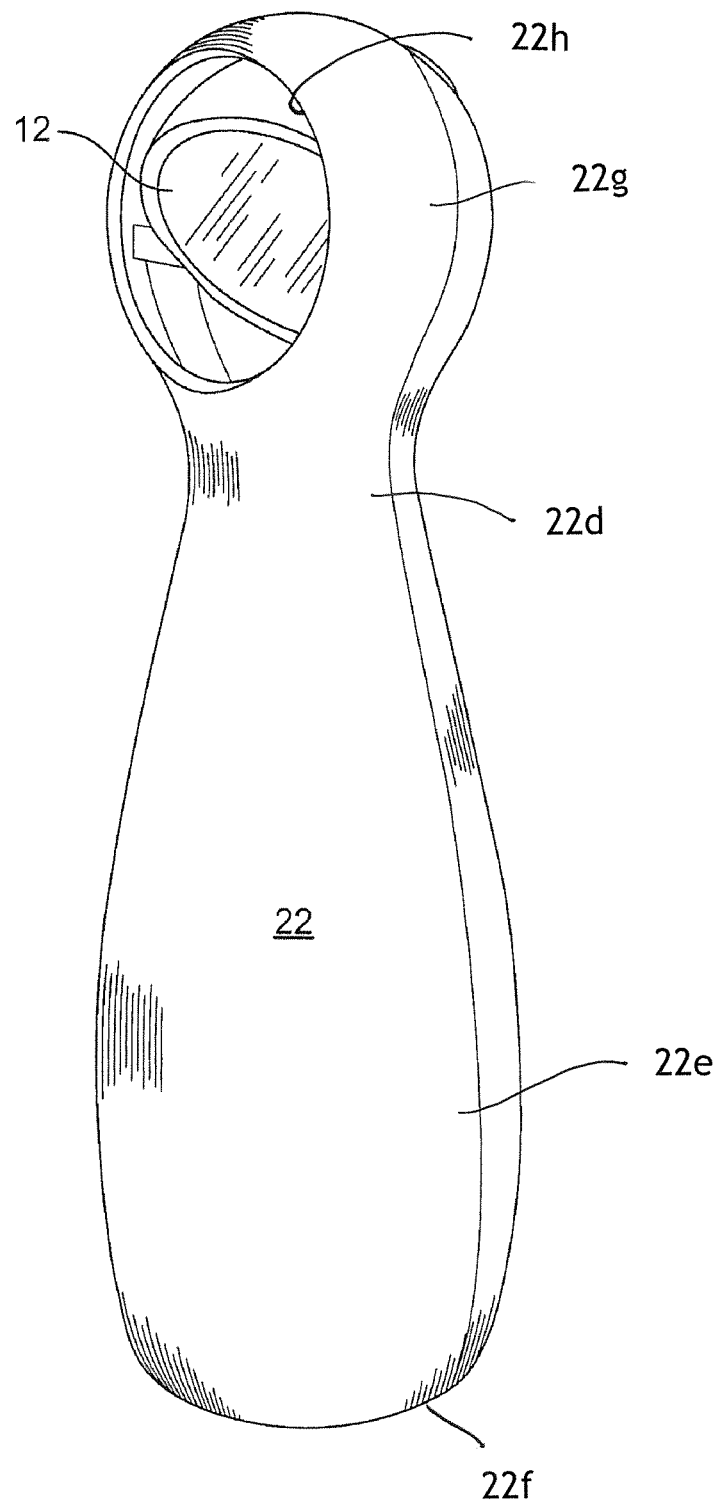
FIG. 2 is a perspective view of the laser pet toy illustrating a housing with a mirror therein in accordance with a second embodiment of the present invention.
Figure 3:
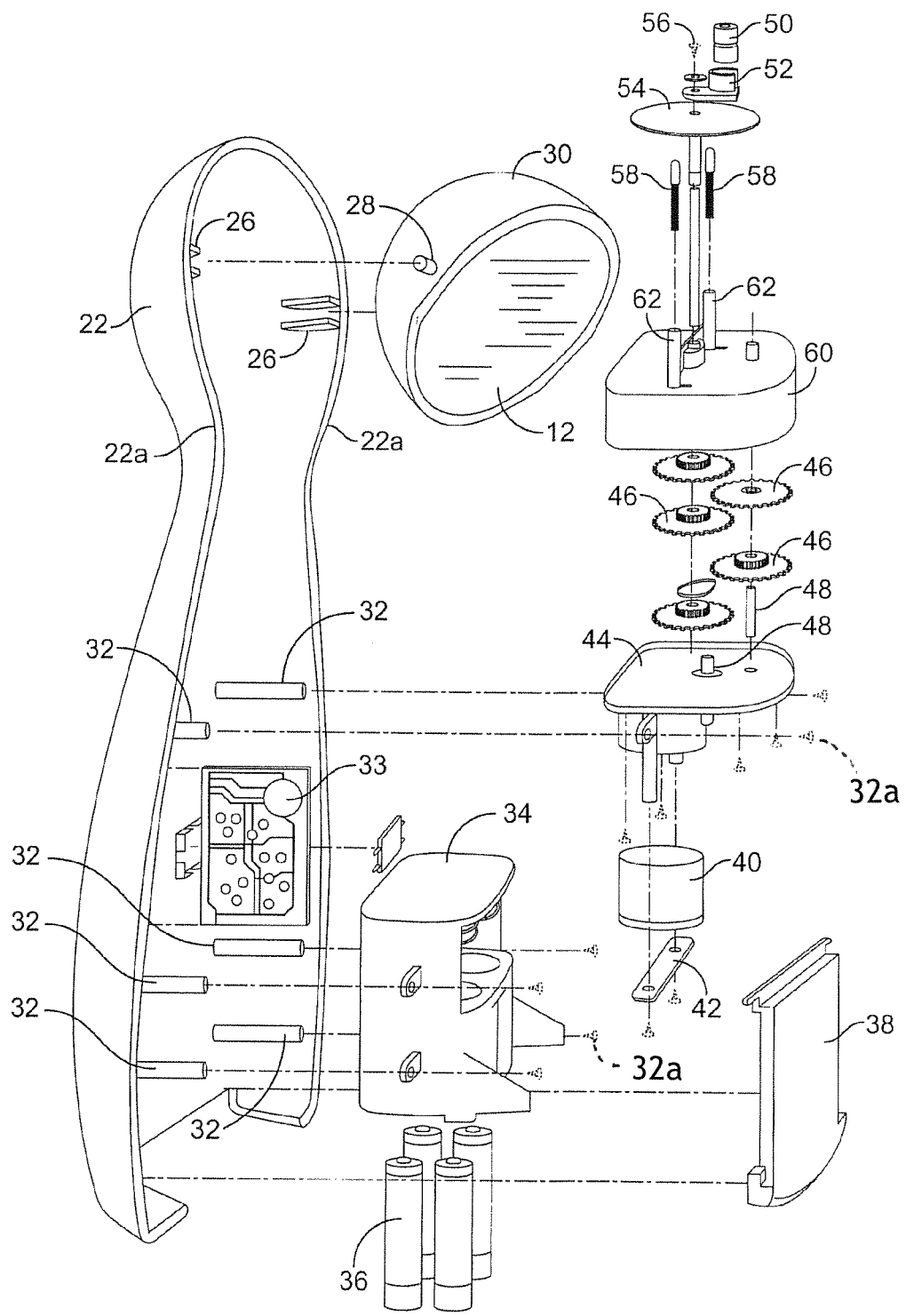
FIG. 3 is an exploded perspective view showing a partial half of the housing and the internal parts in accordance with the second embodiment of the present invention in FIG. 2.

FIGS. 2 and 3 show a second embodiment in frontal elevation and partially exploded perspective views, respectively, having a bowling pin shaped housing 22. The housing 22 defines a hollow shell made from plastic, metal, wood or other suitable material for mounting the components of the toy 10 within. The housing, as shown in FIG. 3, is split in half vertically along edge 22*a*. A neck 22*d* separates a lower belly 22*e* ending in a flat bottom 22*f* allowing the housing 22 to sit upright on a table or floor in use and a bulbous head 22*g* with a generally circular opening 22*h* creating a face on the head 22*g* and a mounting means 26 located on opposing sides of the half so that the reflecting surface of the mirror 12 faces the opening 22*h* to direct the laser beam 16*a* out of the housing 22 onto an opaque surface. In FIG. 3, the mounting means 26 represents a pair of parallel plates spaced apart a predetermined distance from each other. Two pairs of plates are located across from one another on either side of the opening 22*h*. The mirror 12 includes a spherical housing 30 attached to the rear of the mirror 12 with a pair of pins 28 extending on opposing sides of the spherical mirror housing 30. The pins 28 are inserted between the parallel plates 26 on each side of the head 22g, allowing the mirror 12 to rotate about pivot points created by the pins 28 and the plates of the mounting means 26.

The interior of the belly 22e includes mounting posts 32 for securing the mechanical and electrical components by screw fasteners 32a. An electrical control circuit 33, which may include a printed circuit board with a preprogrammed Application Specific Integrated Circuit (ASIC) or microprocessor and other discrete electrical components thereon also having a software program, controls the laser movement within the housing 22 to generate the turns, stops, zigs and zags that creates all sorts of crazy patterns for cats or dogs to chase. A battery compartment or housing 34 is secured to the posts 32 and appropriate batteries 36 are inserted into the battery housing 34 and a battery door 38 that opens on the flat bottom 22f to create a power source for the circuit board 33a, laser 50, a motor 40 connected to a motor housing 44 including gears 46 mounted on gear shafts 48 connected to the motor 40. The laser 50 is mounted on an arm 52 resting on a circular table 54 connected through shafts 48 and gears 46 to the motor 40 to move the laser in non-linear patterns for the red spot projected onto opaque surfaces. Springs 58 mounted on top of a gear housing 60 by insertion into spring holders 62 impinge against the rear of the table 54 to impart movement to the table 54 changing the projection of the laser 50 against the mirror 12 and thereby changing the pattern of the beam for the pets to chase. The power source created by the batteries 36 also drives the laser beam 16a projected from the laser 50.

Figure 5:
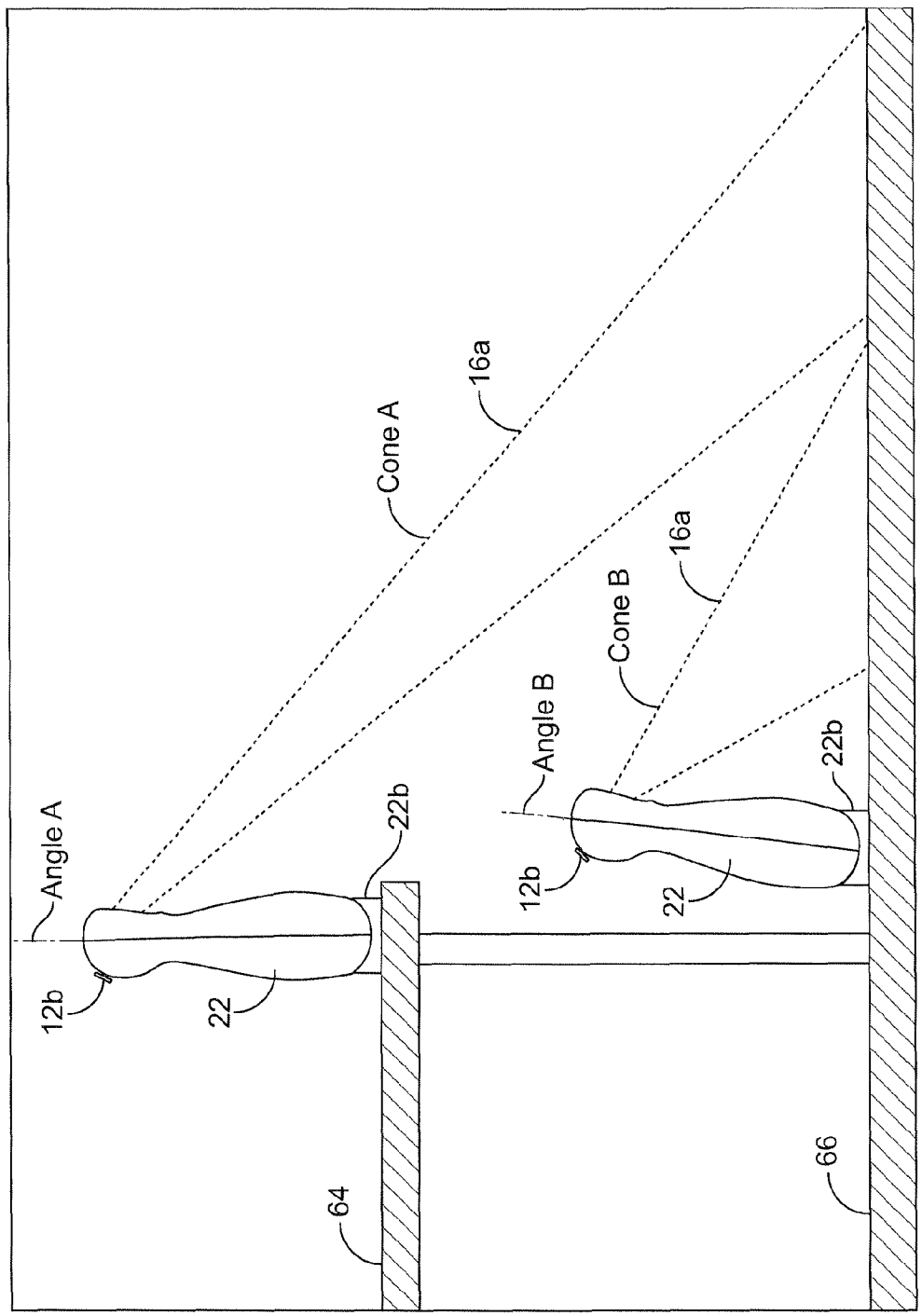
FIG. 5 is a side view of two laser pet toy in operation in which one is mounted on a table and the other is mounted on the floor block in accordance with the second embodiment of present invention of FIG. 2.
Figure 6:
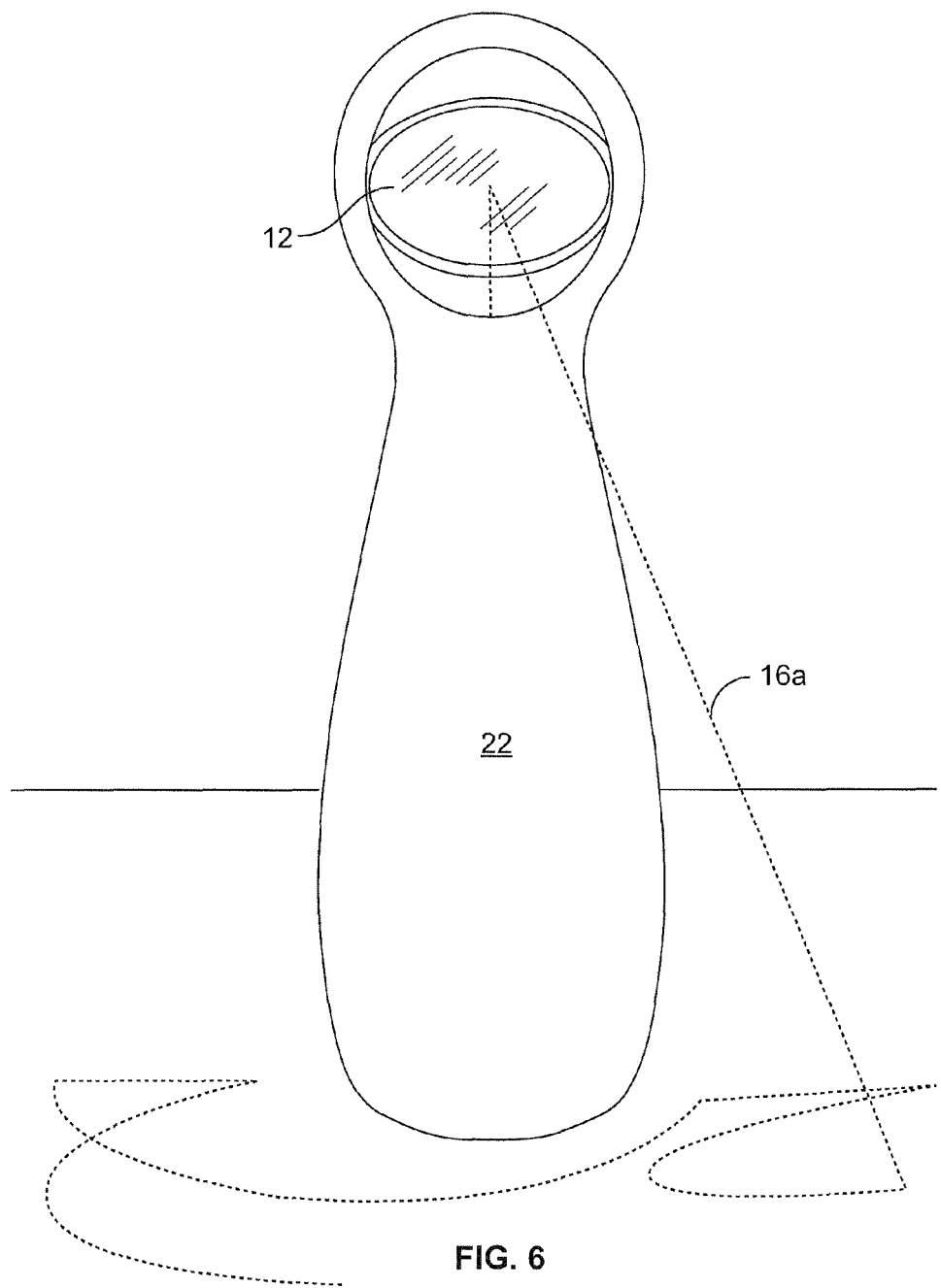
FIG. 6 is a front view of the laser pet toy in operation and mounted on a flat surface showing the random non-linear spot pattern of the red laser spot in accordance with the second embodiment of present invention of FIG. 2.
Figure 7:
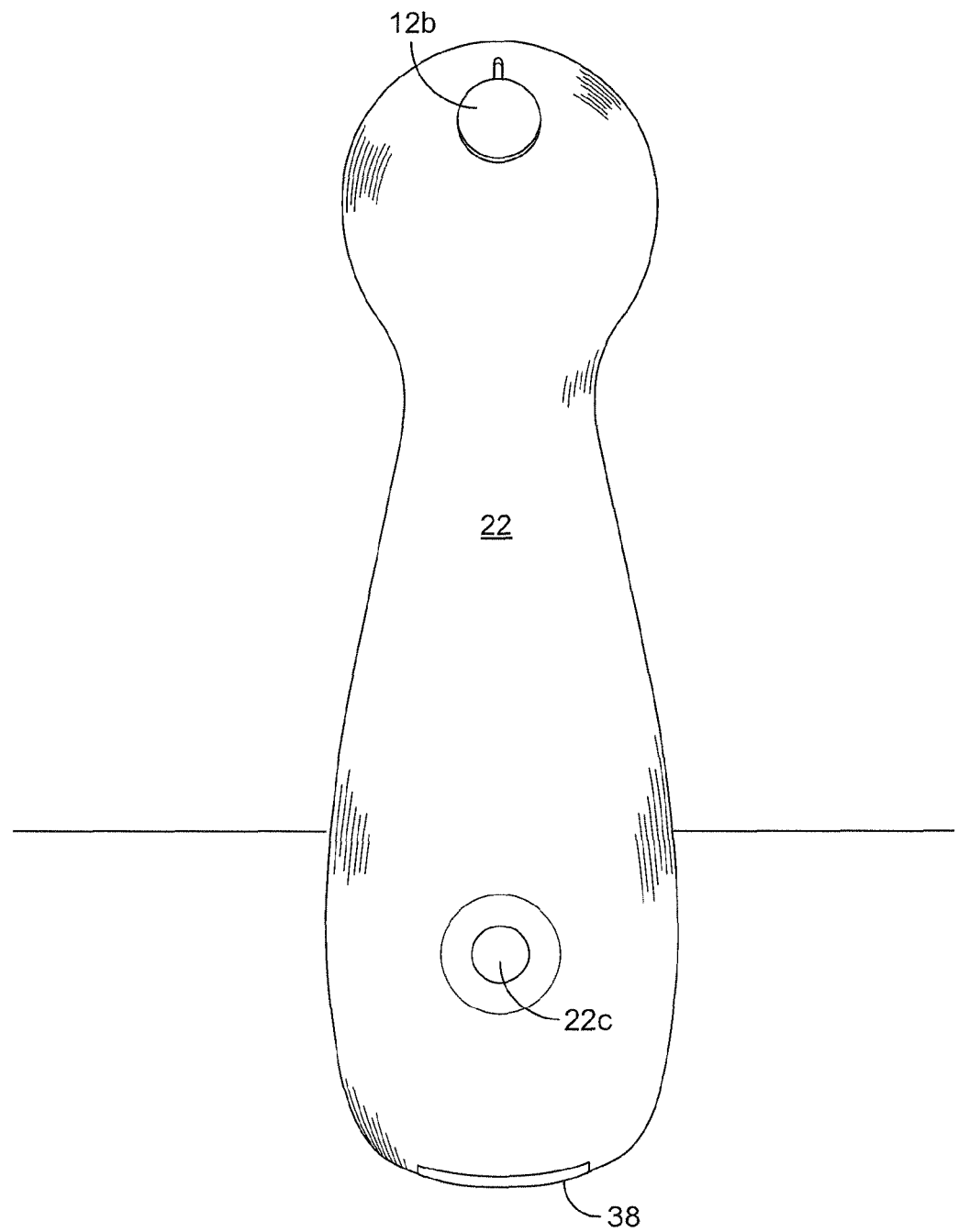
FIG. 7 is a rear view of the laser pet toy showing the mirror adjustment knob and the on/off switch in accordance with the second embodiment of present invention of FIG. 2.

The control circuit 33 is energized by pressing an on/off button or switch 22c on the housing 22 as shown in FIG. 7. Once the button 22c is pressed, the laser 50 is in the automatic mode. In the automatic mode whether the toy is placed on a table 64 or on a floor 66, as shown in FIG. 5, the toy 10 generates random laser patterns with the laser beam 16a terminating in a generally red spot on the opaque surface within a Cone A at Angle A when placed on the table or within Cone B at Angle B when placed on the floor. The housing 22 may also have a more rounded base that can be placed in a base holder 22b. In FIG. 6, a random generation of laser patterns, when in the automatic mode, are traced via the laser beam 16a on a typical opaque surface.

Figure 4:
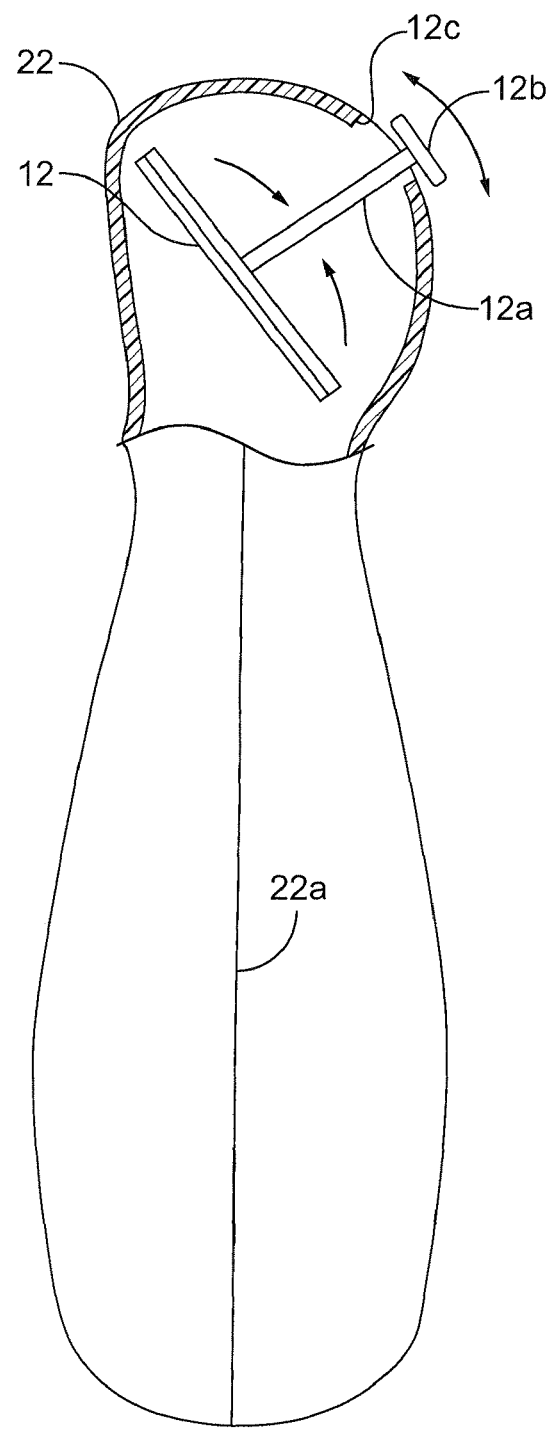
FIG. 4 is a side view showing a partial cut away of the top portion of the housing with a mirror therein in accordance with the second embodiment of present invention of FIG. 2.

The Angle A and B of the laser beam 16a in FIG. 5 can be further changed by adjusting the angle of the mirror in the head 22g of the housing 22 as shown in FIGS. 4 and 7. FIG. 4 shows a cross section of the head with the mirror 12. A post 12a is attached to the rear of the mirror or its housing 30 (not shown) for illustration purposes. The post 12a extends outside of the housing 22 through a slot or opening 12c and terminates in button 12b. The button 12b can be moved up or down to control the angle of the mirror projecting the laser beam 16a out of the opening 22h. This adjustment is usually preset in the automatic mode but allows the pet owner to manually adjust the angle when holding the toy in the hand 4 of the pet owner to generate new patterns in the manual mode. The manual mode is accomplished by holding down the on/off switch 22c for a predetermined time such that the laser beam 16a stops and then the movement of the hand 4 by the pet owner creates whatever laser pattern desired, as shown in FIG. 9.

So when the laser toy 10 is turned on, the laser beam 16a is projected straight up and onto the surface of the mirror and then out of the head opening 22h. The laser 50 mounted on the arm 52 resting on the table or disk 54 with the springs 58 pressing against the underside of the disk 54 that turns according to the nearly infinite variations that a person could preprogram the laser patterns into the control circuit 33. The red spot on the opaque surfaces then turns, stops, zigs and zags in all sorts of direction and random patterns for the cat or dog to chase. The control circuit 33 is also capable of being preprogrammed to turn off after a predetermined time period after running in either automatic or manual mode. For example, the toy power source 20 could be turned off after 15 minutes of operation in automatic mode to prevent the batteries 36 from running down, especially if the pet owner becomes distracted or leaves the area where the toy is placed to initial run on the floor or table.

Figure 8:
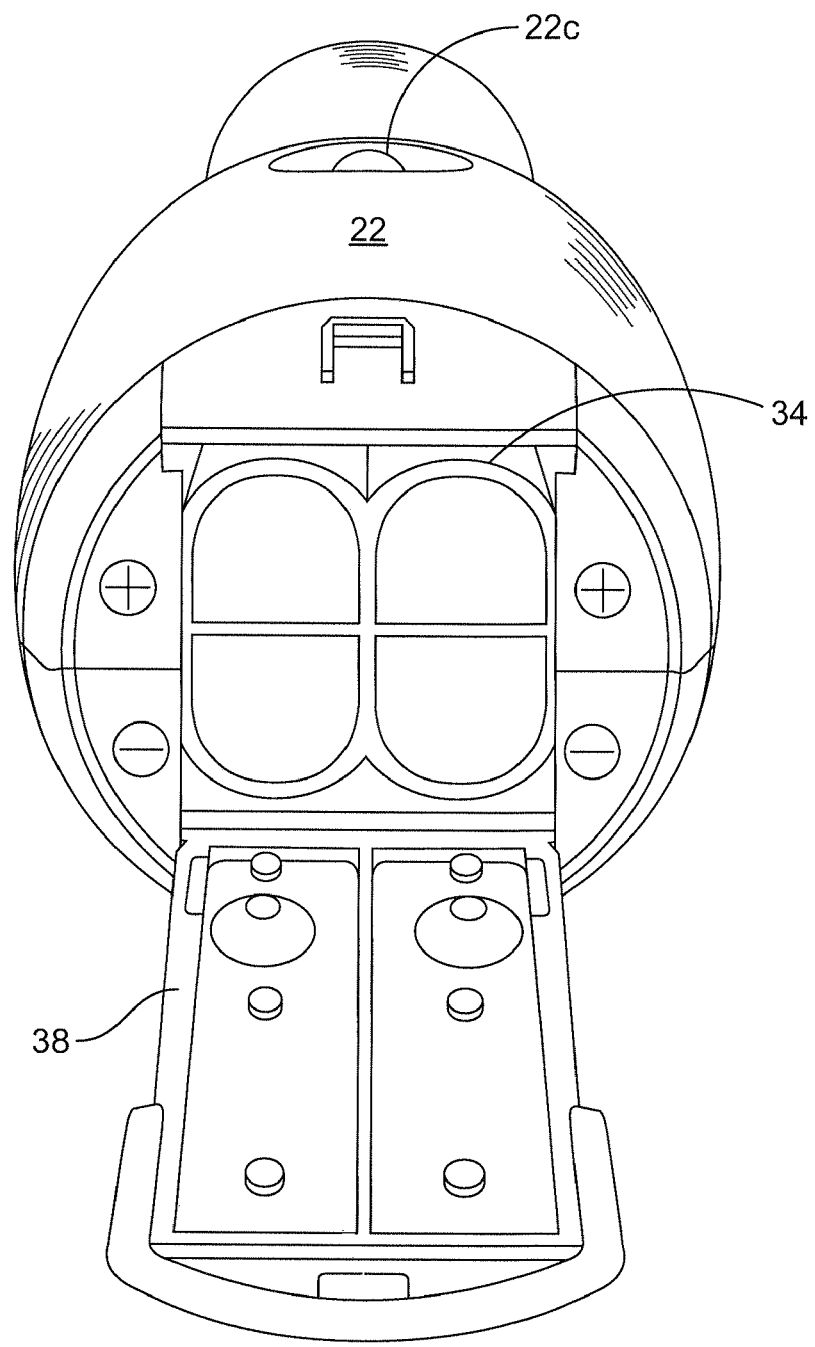
FIG. 8 is a bottom perspective view of the laser pet toy showing the battery compartment with the battery compartment door hinged open in accordance with the second embodiment of the present invention of FIG. 2.

In FIG. 8, the battery compartment 34 is shown with its battery door 38 opened. This permits access to the battery compartment for the insertion of the batteries 36 into the battery compartment 34. When the batteries are inserted into the compartment, it adds weight and stability to the base of the pet toy.

The overall shape of the pet toy 10 housing 22 creates the stable base for standing the toy upright in the operating position to entertain the pet. The shape of the housing 22 also creates an ergonomically suitable gripping surface for the hand that makes it easy to manipulate the toy without causing undue tiring of the hand when in the manual mode. The broad principles of the invention are applicable to just about any shape of the housing so long as the housing structure can capture the above listed components and mount a mirror therein as shown in FIGS. 1-9. Therefore, simple variations to the configuration for the housing as well as the arrangement of components within the housings would still be within the overall inventive concepts as shown.

Again, referring now to FIG. 1, the diagrammatic of the general concept of the laser pet toy 10 made in accordance with the present invention is shown. The mirror 12 is mounted in the upper end of an upright housing. The housing includes the laser 16 projecting the laser beam 16a preferably off the mirror 12 onto a support or shaft 14 that may through a gearing (not shown) rotating the mirror as well as the laser 16 to create random patterns. The motor and gearing is represented by the block 18 that drives the laser 16 and/or mirror 12 to create the random patterns for the laser beam terminating in the red spot on opaque surfaces. The power source and electric control within block 20 provides the source of power to the motor, gearing and laser for operating the same. The electrical control controls the movement of the motor and the laser and may consist of a printed circuit board having an ASIC or other suitable programmable control circuit therein for preprogramming the laser pet toy to create the patterns for the pet to chase. The motor shaft 14 connected to the offset laser or LED light source 16 from the axis of the motor 18 may include a spring (not shown) that is attached in such a manner to the laser 16 to provide a live motion to the object being projected onto the floor or wall such as the movement of a live mouse or bug for example. The source of power 20, which may include four AA batteries 36, as shown in FIG. 3, or may include an electrical cord plugged into an power outlet and electrically connected to the motor 18 via an on/off switch 24 to power the motor 18.

The opening outlined by the laser beam 16a is a generally circular configuration in the side of the housing near the top of the head 10d that generally forms a rounded head, in one preferred embodiment but could be slanted and flat as shown in FIG. 1. The opening or aperture in the side of the head can take many different shapes, as seen in FIG. 2 showing a circular but elliptical and other shapes are possible too. The one characteristic of the aperture is that the lower portion of the opening 22h is designed so that the housing 22 itself does not obstruct a beam of light 16a from the laser 16, 50 when shining downwardly out of the housing 22. In fact, the opening 22h, which may take many different shapes so long as the light beam 16a from the light source 16, 50 is not obstructed by the housing 22, allows many different angles for the light beam 16a as it moves through preprogrammed random pattern on the floor or wall space for entertaining the pet.

The material of housing 22 is capable of being opaque if desired or the housing might be a clear material so the light beam 16a from the laser 16 or 50 passes through the material of the housing 22 to its proposed target. In addition, the housing 22 can take many different shapes in keeping with the description of the present invention that includes live motion with the spring attachment to the laser on the motor driven platform to provide the random movement of the laser red spot on opaque surfaces that is so exciting for the pets to chase.

Referring now to FIG. 2, the rounded head 22g includes the opening 22h on the face portion that can take many different shapes such as generally circular, elliptical, oblong and other shapes conducive for directing the light beam 16a off the mirror 12 and projecting it onto an opaque surface such as the floor or wall. The laser or LED 16 or 50 may have a mask (not shown) over its opening so the light takes a particular desired shape on the floor or wall to imitate a particular object of interest to the pet such as a mouse, bug or even a bone.

Moreover, a sensor may be incorporated to cover motion, heat, proximity and other sensing features that feeds signals representing such things into the preprogrammed ASIC or computer on board to provide other variations in the patterns displayed for the pets. The ASIC is capable of being programmed to have movements that start and then stop for predetermined time periods or vary the speed of the light beam on the floor or wall and such a programmable solid state device can be programmed to receive inputs from various sensors, timers, motion detectors, light detectors, sound detection and other types of sensors and then take a programmed action controlling the beam of light in response to the sensed input to the ASIC 22. The size of the pet toy 10 and its housing 22 is such that it can accommodate most current micro and nano technology sensors available on the open market.

FIGS. 1, 2, 4 and 7 shows various outer housing shapes in keeping with the mirror 12 being rotatably adjustable within the head of the housing 22 for directing a beam of light 16a of a desired image onto the floor or wall. The configuration of the housing, as shown in FIG. 5, with its generally rounded bottom resting in holder 22b, may be weighted on its bottom as such with the batteries or the like so that if a pet tips over the pet toy 10 with its paw, the housing 22 will upright itself automatically. The other configurations of the pet toy 10 are demonstrating variations off of the diagram of the pet toy 10 as shown in FIG. 5 and some configurations in which the opening 22 might extend through more openings in the housing 22.

FIG. 1 shows a diagram of the pet toy 10 in which the mirror 12 is mounted on a wheel or connected to turntable by a shaft 14 that in turn is directly or indirectly connected to the motor 18 to project the laser beam or light source 16a from a laser 16 out of an opening 12c. In one embodiment, the mirror may be attached to the turntable itself with the laser reflecting off the mirror, then even striking a second mirror to reflect out of the housing. The laser pet toy 10 includes a battery door 38 that slidably shuts or opens at the bottom of each toy 10 and the on/off switch 22c also located close to the bottom half of the pet toy 10.

FIG. 3 show the pet toy 10 wherein the arm 52 connected to the laser 50 or LED is off center to reflect a beam of light off the mirror 12 onto the floor when the mirror 12 is adjusted to a predetermined position. With the laser 50 being mounted off center, the motor is preprogrammed to a randomized movement back and forth, stop, and start, move backward or forward in a slow, intermediate or fast pace according to the preprogrammed computer or ASIC on the printed circuit board.

FIG. 8 illustrates the battery door snapped open off the bottom of the pet toy 10 with four batteries 36 uninstalled. The bottom of the toy 10 is generally flat unless the toy 10 includes a rounded bottom as shown in FIG. 5 with the weight of the batteries therein causing the toy 10 to automatically reset upright when tip over by the pet playing with the toy and its light beam on the floor.

The housing 22 of the pet toy 10 could be made of any suitable material and the toy as shown in the various illustrations are generally shown in a plastic material that is durable and safe for interfacing with pets.

Inasmuch as the present described invention is subject to many variations, modifications and changes in details as referred to in the FIGS. 1-9, it is intended that the subject matter discussed above and shown in the accompanying drawings be interpreted as illustrative purposes and not in a limiting sense.

We claim:

1. A light emitting pet toy for entertaining and/or exercising a pet comprising:

a hollow housing having a top, a generally flat bottom, a neck separating the top from the bottom, an oblong upright shape extending between the top and the bottom up to the neck, and an opening in the housing proximate the top;

a battery power source residing within the hollow housing;

a motor connected to the power source mounted within the housing, with the motor having a shaft configured to generate a driving force;

an arm mounted within the housing configured to move in coordination with the driving force of the motor, with the arm being offset a predetermined distance from the motor shaft;

a laser connected to the distal end of the arm that is offset from the motor shaft and being configured to provide a beam of light;

a mirror mounted within the housing near the top of the housing opposite the opening, the mirror being adjustable with respect to the opening and positioned to reflect the beam of light, and the mirror being operatively connected to the arm to adjust an angle of reflection for the beam of light, wherein the beam of light is reflected by the mirror onto an opaque surface outside of the housing, and terminates in a predetermined shape visible on the opaque surface;

an on/off switch connected to the power source for selectively activating the motor;

an electrical control circuit mounted within the housing for controlling the motor and laser movements in automatic and manual modes; and whereby the electrical control circuit is pre-programmed to control the driving force to create movements to the visible shape of light, thereby attracting the attention of a pet to play with the light shape on the opaque surface.

2. A laser-generating pet toy comprising:
an oblong housing having a top and bottom;
a battery mounted within the housing;
a motor mounted within the housing and being powered by the battery;
a shaft operatively connected to and configured to be rotationally driven by the motor;
a laser connected in an offset manner to and movable by the shaft for imparting non-linear movement to the laser and for generating a laser beam;
an opening near the top of the housing;
a mirror mounted within the housing adjacent the opening, the mirror being positioned to reflect the laser beam at a predetermined angle and project the laser beam through the opening and onto an opaque surface outside of the housing, thereby creating a visible light shape on the opaque surface; and
an electrical control circuit mounted in the housing for controlling the activation of the motor and a programming for the movement of the motor shaft and laser to create non-linear patterns of movement for the visible light shape on the opaque surface, wherein such movement is attractive to a pet.

3. The laser-generating pet toy of claim 2, further comprising:
an on/off electrical switch mounted on an exterior of the housing, connecting the battery to the electrical control circuit, the motor and the laser, for selectively activating the pet toy.

4. The laser-generating pet toy of claim 2, further comprising:
a timer in the electrical control circuit, electrically communicating with the motor and the laser to activate and deactivate the motor and the laser according to preselected times.

5. The laser-generating pet toy of claim 2, wherein the housing is in a generally bowling pin shape.

6. The laser-generating pet toy of claim 2, wherein the visible light shape is generally a red spot of a predetermined shape.

7. The laser-generating pet toy of claim 3, wherein the on/off electrical switch is configured such that a momentary pressing of the on/off electrical switch places the laser-generating pet toy in an automatic mode of operation.

8. The laser-generating pet toy of claim 3, wherein the on/off electrical switch is configured such that the temporary holding down of the on/off electrical switch for a predetermined time places the laser-generating pet toy in a manual mode.

9. The laser-generating pet toy of claim 5, wherein:
the bowling pin shape includes a generally flat bottom, a belly holding the electrical control circuit, the motor, and the laser, and
the opening resides in the head exposing the mirror.

10. The laser-generating pet toy of claim 7, wherein the electrical control circuit is programmed such that the patterns of movement for the visible light shape are random when the laser-generating pet toy is in its automatic mode of operation.

11. The laser-generating pet toy of claim 8, wherein the movement pattern is predetermined in the manual mode.

12. The laser-generating pet toy of claim 6, further comprising:
a disk with the laser mounted on the disk, and wherein the disk is controlled by the electrical control circuit being pre-programmed to create irregular movement of the light beam on the opaque surface outside of the housing.

13. A laser-generating pet toy, comprising:
a vertically extending oblong housing having a flat bottom for allowing the housing to stand upright on a flat surface, and a head forming an enclosed interior;
an opening in the side of the head;
a mirror mounted within the housing at an angle adjacent to the opening;
a laser source mounted within the housing and pointing vertically upward toward the angled mirror, thereby generating a laser beam reflecting off of the angled mirror and onto an opaque surface outside of the housing;
a disk rotatably mounted in the housing parallel to the bottom, wherein the laser is mounted near an outer edge of the disk;
a motor having a shaft connected to the center of the disk for rotating the disk;
a spring impinging upon the bottom of the disk for causing flexing of the disk;
a power source mounted within the housing for operating the motor and laser;
an electrical control circuit having a program for controlling the movement of the motor to created random and non-linear movement patterns of the laser beam upon the opaque surface; and
an on/off switch on the exterior of the housing connected to the electrical control switch for turning on and off the electrical control circuit.

14. The laser-generating pet toy of claim 13, wherein the manual on/off switch creates an automatic mode of the electrical control switch for generating random movement patterns when the on/off switch is in an "on" state.

15. The laser-generating pet toy of claim 13, wherein the manual on/off switch creates a manual mode of the electrical control switch for a pet owner to generate the movement patterns when the on/off switch is in an "on" state.

* * * * *